(12) United States Patent
Blake et al.

(10) Patent No.: US 7,660,463 B2
(45) Date of Patent: Feb. 9, 2010

(54) FOREGROUND EXTRACTION USING ITERATED GRAPH CUTS

(75) Inventors: Andrew Blake, Stapleford (GB); Carsten Curt Eckard Rother, Cambridge (GB); Padmanabhan Anandan, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 645 days.

(21) Appl. No.: 10/861,771

(22) Filed: Jun. 3, 2004

(65) Prior Publication Data

US 2005/0271273 A1 Dec. 8, 2005

(51) Int. Cl.
G06K 9/34 (2006.01)
G06K 9/62 (2006.01)

(52) U.S. Cl. .................................. 382/173; 382/225

(58) Field of Classification Search ................. 382/173
See application file for complete search history.

(56) References Cited

U.S. PATENT DOCUMENTS

| | | | |
|---|---|---|---|
| 6,009,442 A | 12/1999 | Chen et al. | |
| 6,233,575 B1 | 5/2001 | Agrawal et al. | |
| 6,592,627 B1 | 7/2003 | Agrawal et al. | |
| 2002/0048401 A1 | 4/2002 | Boykov et al. | |
| 2002/0060650 A1 | 5/2002 | Wakashiro et al. | |
| 2002/0122587 A1* | 9/2002 | Lim et al. | 382/165 |
| 2002/0135483 A1* | 9/2002 | Merheim et al. | 340/573.1 |
| 2002/0191861 A1* | 12/2002 | Cheatle | 382/282 |
| 2003/0043160 A1* | 3/2003 | Elfving et al. | 345/581 |
| 2003/0053658 A1* | 3/2003 | Pavlidis | 382/103 |
| 2003/0095707 A1* | 5/2003 | Colmenarez et al. | 382/173 |
| 2003/0123704 A1* | 7/2003 | Farmer et al. | 382/103 |
| 2005/0157926 A1 | 7/2005 | Moravec et al. | |
| 2006/0242147 A1 | 10/2006 | Gehrking et al. | |

OTHER PUBLICATIONS

Blake et. al, Interactive Image Segmentation Using an Adaptive GMMRF, 8th European Conference on Computer Vision, Prague, Czech Republic, May 11-14, 2004. Proceedings, Part I, May 10, 2004, Springer Berlin / Heidelberg, vol. 3021/2004, pp. 428-441.*
Blake, A., et al., "Interactive Image Segmentation using an adaptive GMMRF model," In Proc. European Conf. Computer Vision, 2004, pp. 1-14.
Boykov, Y., et al., "Interactive Graph Cuts for Optimal Boundary & Region Segmentation of Object in N-D Images," In Proc. IEEE Int. Conf. on Computer Vision, Jul. 2001, vol. I, pp. 105-112.

(Continued)

*Primary Examiner*—Bhavesh M Mehta
*Assistant Examiner*—David P Rashid

(57) ABSTRACT

Techniques are disclosed to provide more efficient and improved extraction of a portion of a scene without requiring excessive user interaction. More particularly, the extraction may be achieved by using iterated graph cuts. In an implementation, a method includes segmenting an image into a foreground portion and a background portion (e.g., where an object or desired portion to be extracted is present in the foreground portion). The method determines the properties corresponding to the foreground and background portions of the image. Distributions may be utilized to model the foreground and background properties. The properties may be color in one implementation and the distributions may be a Gaussian Mixture Model in another implementation. The foreground and background properties are updated based on the portions. And, the foreground and background portions are updated based on the updated foreground and background properties.

26 Claims, 6 Drawing Sheets

OTHER PUBLICATIONS

Boykov, Y., et al., "Computing Geodesics and Minimal Surfaces via Graph Cuts," In Proceedings of IEEE Int. Conf. on Computer Vision (ICVV), Nice, France, Jul. 2001, vol. I, pp. 26-33.
Caselles, V., et al., "Geodesic Active Contours," In Proc. IEEE Int. Conf. on Computer Vision 22 (1), 1997, pp. 61-79.
Chuang, Y.-Y., et al., "A Bayesian Approach to Digital Matting," In Proc. IEEE Conf. Computer Vision and Pattern Recog., 2001, 8 pages.
Kolmogorov, V., et al., "What Energy Functions can be Minimized via Graph Cuts?" In Proc. European Conf. Computer Vision, 2002, pp. 1-17.
Kwatra, V., et al., "Graphcut Textures: Image and Video Synthesis Using Graph Cuts," Proce. ACM Siggraph, 2003, pp. 277-286.
Mortensen, E., et al., "Intelligent Scissors for Image Composition," Proc. ACM Siggraph, 1995, pp. 191-198.
Mortensen, E., et al., "Toboggan-Based Intelligent Scissors with a Four Parameter Edge Model," In Proc. IEEE Conf. Computer Vision and Pattern Recog., 1999, vol. 2, pp. 452-458.
Ruzon, M., et al., "Alpha Estimation in Natural Images," In Proc. IEEE Conf. Comp. Vision and Pattern Recog., vol. 1, Jun. 2000, pp. 18-25.
Dempster, A. P., et al., "Maximum Likelihood from Incomplete Data via the $EM$ Algorithm," Journal of the Royal Statistical Society, Series B, vol. 39, 1977, pp. 1-38.
Greig, D., et al., "Exact Maximum A Posteriori Estimation for Binary Images," Journal of the Royal Statistical Society, Series B, vol. 51, No. 2, 1989, pp. 271-279.
Kass, M., et al., "Snakes: Active Contour Models," Proc. IEEE Int. Conf. on Computer Vision, 1987, pp. 259-268.
"Adobe Photoshop User Guide", pp. 55-57, Adobe Systems Inc., 1993.

* cited by examiner

FOREGROUND EXTRACTION USING ITERATED GRAPH CUTS

TECHNICAL FIELD

The present invention generally relates to digital image processing, and more particularly to foreground extraction using iterated graph cuts.

BACKGROUND

As computer technology improves, computer systems with more powerful processor(s) and larger storage unit(s) become more commonplace. With this growth in processing power and storage size, implementation of digital imaging technology also becomes more practical. For example, higher resolution images may be processed in a shorter time period.

Digital images of a scene may be directly acquired (e.g., by a digital camera) or conventionally taken by a film-based camera and later digitized (e.g., by a scanner). Once an image is in digital format, it may be digitally manipulated. Often, a first step in digital image processing involves the selection of certain portions of a scene. Digital techniques (such as filtering, copying, and pasting) may then be applied to the selected portion(s).

Currently, a number of techniques are used to extract a foreground from an image with varying degrees of user involvement. For example, a user can use a magic wand tool to designate a user-specified point or region to compute a region of connected pixels such that all the selected pixels fall within some adjustable tolerance of the color statistics of the specified region. Finding the correct tolerance level is often cumbersome with a magic wand. More specifically, since the distribution in color space of foreground and background pixels have a considerable overlap, a satisfactory segmentation is hard to achieve.

Another current technique utilizes intelligent scissors (a.k.a., live wire or magnetic lasso) which allows a user to choose a "minimum cost contour" by roughly tracing an object's boundary with a pointing device such as a mouse. As the pointing device moves, the minimum cost path from the cursor position back to the last "seed" point is shown. If the computed path deviates from the desired one, additional user-specified "seed" points can be required. One main limitation of this tool is apparent: for highly texture (or un-textured) regions many alternative "minimal" paths exist. Consequently, many user interactions can be necessary to obtain a satisfactory result.

Bayes matting is yet another technique which models color distributions probabilistically to achieve full alpha mattes. More particularly, the user specifies a "trimap" in which background and foreground regions are marked, and alpha values are computed over the remaining region. High quality mattes may be obtained, but generally when the remaining region is not relatively too large and the background/foreground color distributions are sufficiently well separated. Also, a considerable degree of user interaction can be required to construct an internal and an external path for Bayes matting.

Furthermore, an image segmentation technique based on graph cut utilizes a setting similar to Bayes matting, i.e., including trimaps and probabilistic color models, to achieve segmentation. In particular, graph cuts restrict the alpha at each pixel to have a value of 0, or 1, without any gradations. Even though graph cuts generally provide better results than, for example, Bayes matting, graph cuts still require that a user supply the trimap by labeling some foreground and background portions, which gives a trimap.

Accordingly, more efficient and improved extraction of a desired portion of a scene is desired.

SUMMARY

Techniques are disclosed to provide more efficient and improved extraction of a portion of a scene (e.g., foreground of a scene, an object within the scene, and the like), without requiring excessive user interaction. More particularly, the extraction may be achieved by using iterated graph cuts.

In an implementation, a method includes segmenting an image into a foreground portion and a background portion (e.g., where an object or desired portion to be extracted is present in the foreground portion). The method determines the properties corresponding to the foreground and background portions of the image. Distributions may be utilized to model the foreground and background properties. The properties may be color in one implementation and the distributions may be a Gaussian Mixture Model in another implementation. The foreground and background properties are updated based on the portions. And, the foreground and background portions are updated based on the updated foreground and background properties.

In another implementation, a method assigns a model component to each pixel of an image which may contain an object to be extracted. The method determines a plurality of modeling parameters corresponding to a foreground and background portion of the image. And, the method iteratively estimates segmentation of the foreground portion.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program.

The computer program product encodes a computer program for a computer process executing on a computer system. The computer process segments an image into a foreground portion and a background portion (e.g., where the desired portion to be extracted is present in the foreground portion). The process determines the properties corresponding to the foreground and background portions of the image. Distributions may be utilized to model the foreground and background properties. The properties may be color in one implementation and the distributions may be a Gaussian Mixture Model in another implementation. The foreground and background properties are updated based on the portions. And, the foreground and background portions are updated based on the updated foreground and background properties.

Other implementations are also described and recited herein.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

The following disclosure generally describes techniques for improving digital image processing. More specifically, techniques are disclosed for extracting a portion of a scene, without excessive user interaction. Accordingly, it is envisioned that the techniques discussed herein may be applied to any desired portion of an image (e.g., an object, a foreground, and the like).

Overview

Figure 1:
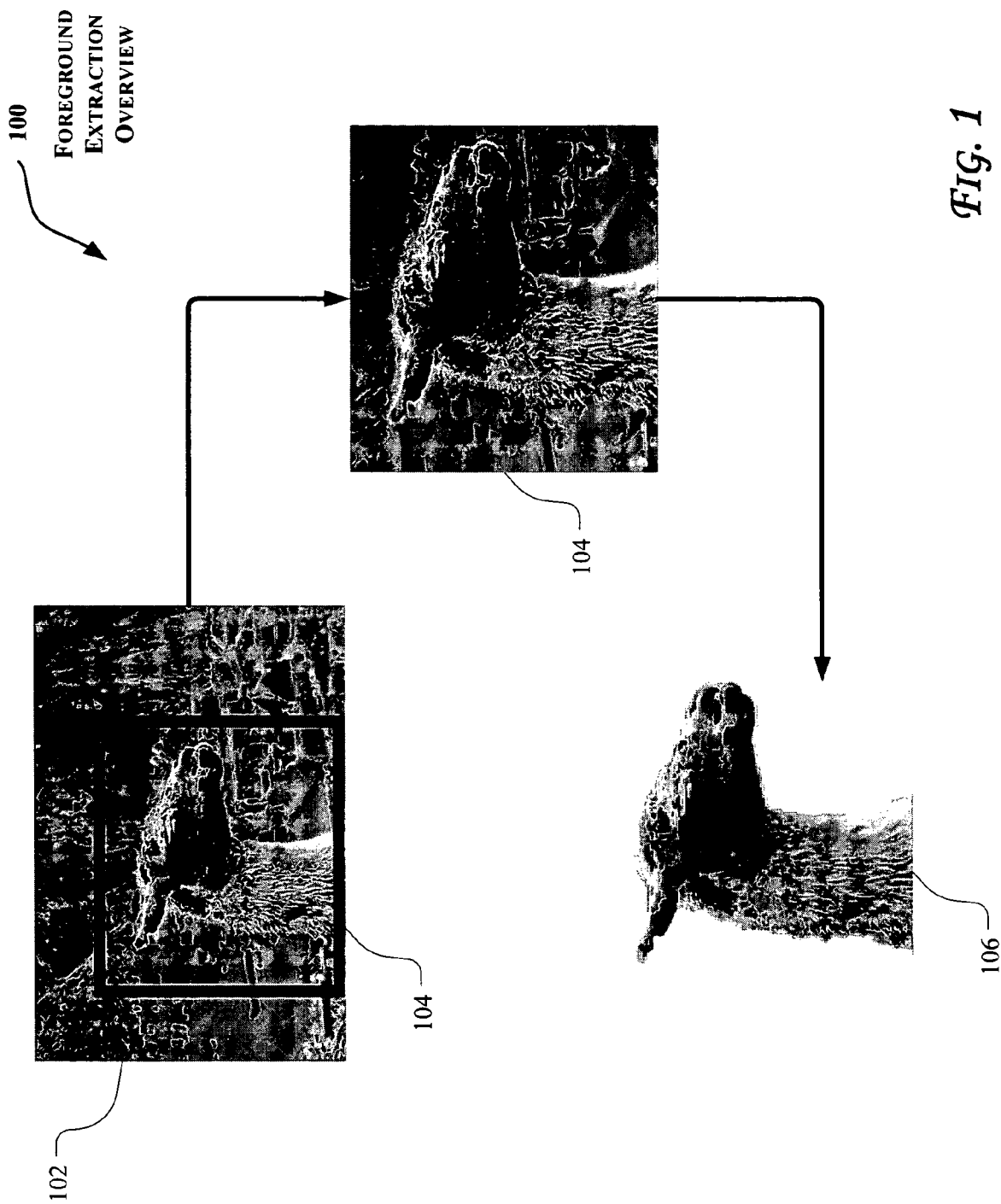
FIG. 1 illustrates an exemplary flow diagram for extracting a portion of an image.

FIG. 1 illustrates an exemplary flow diagram 100 for extracting a portion of an image. As illustrated in FIG. 1, an image 102 includes a desired object within a region 104. To extract the object within the region 104, a user may select the desired region (104) by drawing a rectangle (or another shape, such as a lasso, polygon, triangle, trapezoid, ellipse, circle, and the like) to enclose the object. Accordingly, the user selects the desired portion by defining two points (i.e., a start point and an end point) on the image 102 in an implementation. Also, the user does not need to necessarily trace the portion of interest with particularity.

Figure 2:
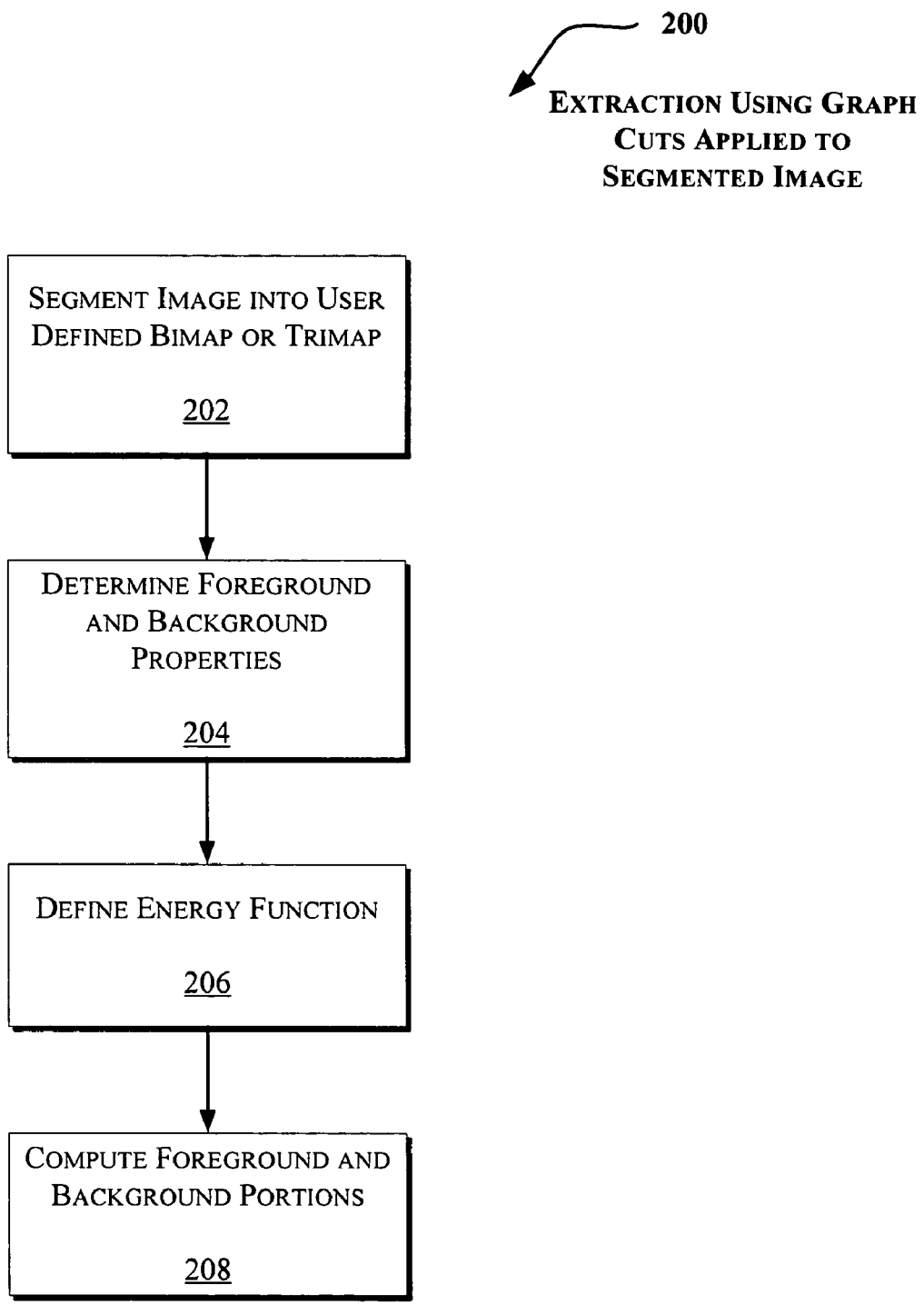
FIG. 2 illustrates an exemplary method for extracting an image portion using graph cuts applied to a user defined bimap or trimap.
Figure 3:
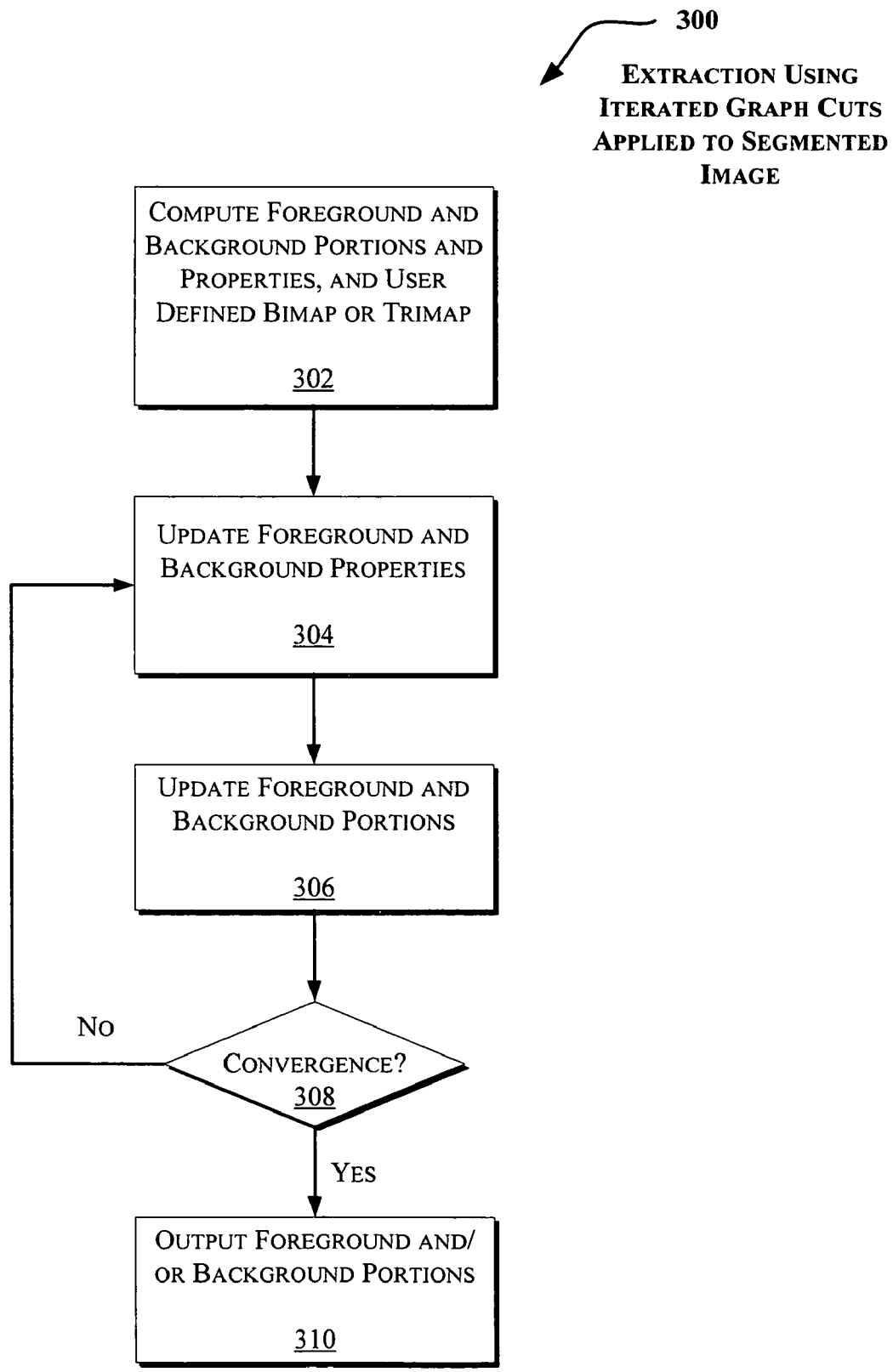
FIG. 3 illustrates and exemplary method for extracting an image portion using iterated graph cuts.

Once the region 104 is selected, the object or portion of interest within the region 104 can be extracted (106) by the techniques discussed herein (e.g., with reference to FIGS. 2 and 3). In one implementation, the extracted portion 106 may be pasted into another image or otherwise processed digitally (e.g., by applying filters, color changes, and the like).

Foreground Extraction Using Iterated Graph Cuts

FIG. 2 illustrates an exemplary method 200 for extracting an image portion using graph cuts applied to a user defined bimap or trimap. In method 200, the user first segments an image into a bimap or a trimap (202). In one implementation, utilizing a bimap (instead of a trimap) is envisioned to assist a user by requiring less user interaction. In a bimap segmentation, a user may define a background portion and an unknown portion (.$T_B$, $T_U$ or B and U, respectively, as discussed further herein). In trimap segmentation, a user may initialize a trimap of the image at hand. The trimap includes regions $T_B$, $T_U$, and $T_F$, where $T_B$ and $T_F$ are the background and foreground regions, respectively, and $T_U$ is the remaining region (unknown region). For simplicity, $T_B$, $T_U$, and $T_F$ may be referred to herein as B, U, and F regions, respectively. The user may initialize the bimap by supplying $T_B$ and $T_U$ (as discussed with reference to FIG. 1). Then, $T_U$ and $T_F$ initially have the same value (e.g., the interior of the rectangle (104) in FIG. 1). The image data may be modeled as discussed below.

Specifying the Energy for Graph Cuts

The image is considered to include pixels $z_n$, each in color space. The color space may be a red-green-blue (RGB) color space. Distributions such as probability distributions, like a Gaussian mixture models (GMMs), may be used to implement the color distribution in the color space. For example, each GMM (one for the background and one for the foreground) is taken to be a full-covariance Gaussian mixture with K components (e.g., K=5). Also, histograms may be utilized (e.g., for monochrome implementations). Instead of distributions, discriminative methods may also be used to define the likelihood of a pixel belonging to a certain color distribution. Other image features or properties may also be used as discussed further below.

In order to deal with the GMM tractably, in the optimization framework, an additional vector k={$k_1$, ..., $k_n$, ..., $K_N$} is utilized, with $k_n \in \{1, \ldots K\}$, assigning, to each pixel, a unique GMM component (one component either from the background or the foreground model) according as opacity values (which express the hard segmentation of the image) $\alpha_n$=0 or 1.

Therefore, GMM components may be assigned to pixels for each n in $T_U$:

$$k_n := \underset{k_n}{\mathrm{argmin}} D_n(\alpha_n, k_n, \theta, z_n).$$

Referring to FIG. 2, properties of the foreground and background distributions are determined (204). These properties may include information regarding the portions at hand, foreground and/or background, which are defined by the user in 202. It is envisioned that many different feature such as color, blur, and the like may be used as properties. In one implementation, GMM parameters are learned from data z as will be further discussed below.

The Gibbs energy for segmentation may be defined (206) as:

$$E(\underline{\alpha}, k, \underline{\theta}, z) = U(\underline{\alpha}, k, \underline{\theta}, z) + V(\underline{\alpha}, z),$$

where the parameter $\underline{\theta}$ describes the image foreground and background distributions (as learned, for example, in the stage 204), V is a smoothness term using a contrast term computed by Euclidean distance in color space, U evaluates the fit of opacity distribution $\underline{\alpha}$ to the data z, given the parameter $\underline{\theta}$ and taking account of the color GMM models, where:

$$U(\underline{\alpha}, k, \underline{\theta}, z) = \sum_n D_n(\alpha_n, k_n, \underline{\theta}, z_n),$$

where $D(\alpha_n, k_n, \underline{\theta}, z_n) = -\log p(z_n|\alpha_n, k_n, \underline{\theta}) - \log \pi(\alpha_n, k_n)$, and p( ) is a Gaussian probability distribution, and $\pi$( ) are mixture weighting coefficients, so that (up to a constant):

$$D(\alpha_n, k_n, \underline{\theta}, z_n) = -\log \pi(\alpha_n, k_n) + \frac{1}{2}\log \det \sum(\alpha_n, k_n) +$$
$$\frac{1}{2}[z_n - \mu(\alpha_n, k_n)]^T \sum(\alpha_n, k_n)^{-1}[z_n - \mu(\alpha_n, k_n)].$$

Therefore, the parameters of the model are:

$$\underline{\theta} = \{\pi(\alpha,k), \mu(\alpha,k), \Sigma(\alpha,k), \alpha=0,1, k=1 \ldots K\},$$

(hence, the weight $\pi$, means $\mu$, and covariances $\Sigma$ of 2K Gaussian components for the background and foreground distributions). The smoothness term V term is computed as follows (where the contrast term is computed using Euclidean distance in the color space):

$$V(\underline{\alpha}, z) = \gamma \sum_{(m,n)\in C} [\alpha_n \neq \alpha_m] \exp-\beta\|z_m - z_n\|^2,$$

where C is the set of pairs of neighboring pixels. When the constant β=0, the smoothness term is simply the well-known Ising prior, encouraging smoothness everywhere, to a degree determined by the constant γ. In an implementation, β may be greater than 0. to relax the tendency to smoothness in regions of high contrast. The constant β may be chosen as:

$$\frac{1}{\beta} = 2\langle(z_m - z_n)^2\rangle,$$

where < > denotes expectation over an image sample. In an implementation, such a choice of β ensures that the exponential term in V switches appropriately between high and low contrast.

In light of the energy model discussed above, the segmentation can be estimated as a global minimum:

$$\hat{\underline{\alpha}} = \arg\min_{\underline{\alpha}} E(\underline{\alpha}, \underline{\theta}).$$

Accordingly, the minimization may be done using a standard minimum cut algorithm. In one implementation, the one-shot minimum cut estimation algorithm is replaced by an iterative technique that alternates between estimation and parameter learning (as will be further discussed in the next section). The method 200 continues by computing the foreground and background portions (208), which is the result, $\underline{\alpha}$, of the energy minimization. All pixels in the trimap region $T_B$ are assigned to background and all pixels in $T_F$ to foreground. Pixels in $T_U$ are assigned to either foreground or background, depending on the result $\underline{\alpha}$.

Segmentation by Iterative Energy Minimization

FIG. 3 illustrates and exemplary method 300 for extracting an image portion using iterated graph cuts. The inputs to the method 300 are a background portion and a foreground portion and properties (302), such as discussed with reference to FIG. 2, and also the bimap or trimap defined by the user. The foreground and background portions are used to update the foreground and background properties (304) (e.g., based on the portions computed by the stage 208 of FIG. 2). This updating process is further discussed below. As will be further discussed below, the foreground and background properties may also be updated based on updated foreground and background portions (rather than the initially computed background and foreground portions).

The foreground and background portions are updated (306), based on the updated foreground and background properties (304). For example, the updating may be done by running a minimum cut algorithm (e.g., a one-shot version or an iterative version as discussed with reference to FIG. 2). This process uses the initial user defined bimap or trimap, in order to determine the unknown region U where new foreground or background labels are inferred. In case of user interactions (see below), the new bimap or trimap, which was edited by the user, is used.

The method 300 repeats the stages 304 through 306 until it is determined that convergence has been achieved (308). In an implementation, a computer program (such as those discussed with reference to FIG. 7) determines whether convergence has been achieved (e.g., by setting a threshold). Once it is determined that convergence has been achieved, the foreground and/or background portion(s) are output (310). Accordingly, the method 300 provides a desired portion of an image by iteratively updating the foreground and background properties and the foreground and background portions in an implementation.

Figure 5:
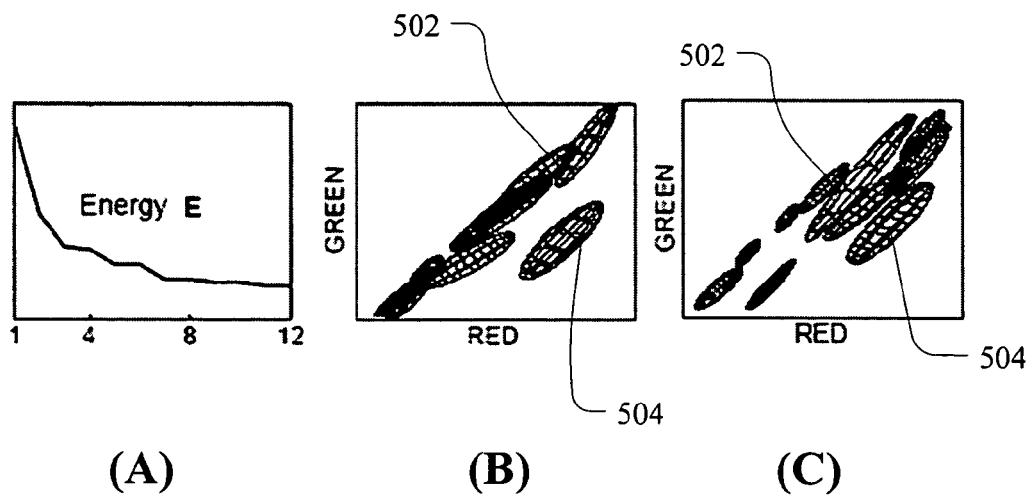
FIGS. 5A-C illustrate exemplary monotonical decrease in energy E and the corresponding background and foreground separation.

In an implementation, the structure of the method 300 guarantees proper convergence properties (i.e. to a local minimum). This is because each of the stages 304 to 306 of iterative minimization can be shown to be a minimization of the total energy E with respect to the three sets of variables k, $\underline{\theta}$, $\underline{\alpha}$ in turn. Hence, E decreases monotonically, and this is illustrated in practice in FIG. 5 as will be discussed further below.

It is envisioned that the iterative minimization may reduce the amount of user interaction needed to complete a segmentation task, relative to the one-shot graph cut approach. This is apparent in two ways. First the degree of user editing required, after initialization and optimization, is reduced. Second, the initial interaction can be simpler, for example by allowing incomplete labeling by the user, as described below.

In summary, the iterative energy minimization allows automatic refinement of the opacities $\underline{\alpha}$, i.e. foreground and background portions, as newly labeled pixels from the $T_U$ region of the initial trimap are used to refine the color GMM parameters $\underline{\theta}$ discussed above.

Modelling and Updating the Foreground and Background Properties

Figure 4:
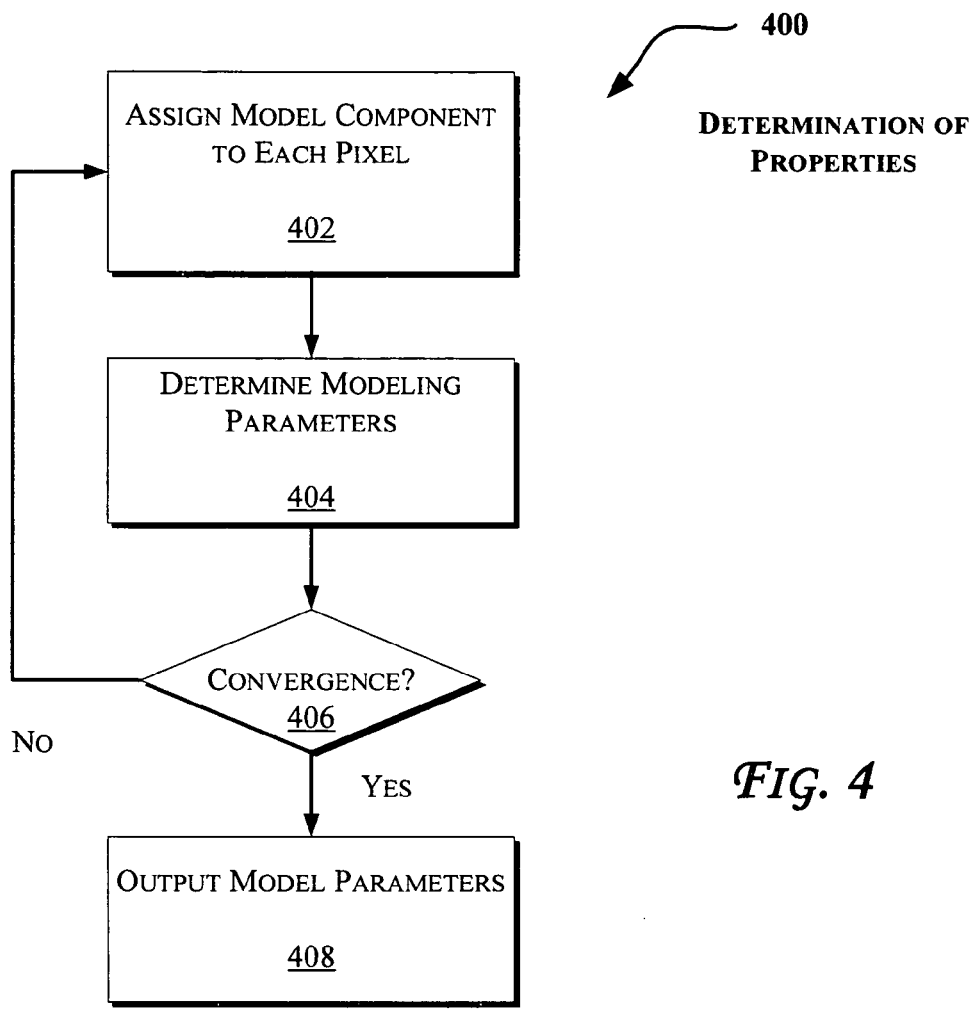
FIG. 4 illustrates an exemplary method for determination of foreground and background properties.

FIG. 4 illustrates an exemplary method 400 for determination of foreground and background properties (e.g., as discussed with reference to the stage 204 of FIG. 2). After initialization of the bimap or trimap (such as discussed with reference to FIG. 2), a model component $k_n \in \{1, \ldots, K\}$ is assigned to each pixel n (402). The stage 402 may be done by simple enumeration of the $k_n$ values for each pixel n $$\left(\text{namely, } k_n := \arg\min_{k_n} D_n(\alpha_n, k_n, \underline{\theta}, z_n)\right).$$

A set of modeling parameters (e.g., Gaussian) are determined from the data z (404):

$$\underline{\theta} := \arg\min_{\underline{\theta}} U(\underline{\alpha}, k, \underline{\theta}, z).$$

The stage 404 may be implemented as a set of Gaussian parameter estimation procedures, as follows (this is also known as Expectation Maximization (EM)). For a given GMM component k in, for example, the foreground model, the subset of pixels $F(k) = \{z_n : k_n = k \text{ and } a_n = 1\}$ is defined. The mean $\mu(\alpha,k)$ and covariance $\Sigma(\alpha,k)$ are estimated in standard fashion as the sample mean and covariance of pixel values in F(k) and weights are estimated as:

$$\pi(\alpha,k) = |F(k)|/\Sigma|F(k)|,$$

where |S| denotes the size of a set S.

After computing the model parameters, the pixels can be reassigned to model components $k_n \in \{1, \ldots, K\}$. In one implementation, the stages 402 and 404 are repeated until convergence (406) is achieved. Accordingly, this method is guaranteed to converge to a local minimum in an implementation.

The output of the method 400 (408) is the model parameters (i.e., the properties of either foreground or background). This iterative algorithm is performed separately to obtain the properties for foreground and background in one implementation.

Convergence of Iterative Minimization

FIG. 5A illustrates exemplary monotonical decrease in energy E and the corresponding background and foreground separation. The GMM in RGB color space (side-view showing R, G) at initialization (FIG. 5B) and after convergence (FIG. 5C). K equal to 5 mixture components was used for both background (e.g., 502) and foreground (e.g., 504). Initially (FIG. 5B), both GMMs overlap considerably, but are better separated after convergence (FIG. 5C), as the foreground/background labeling has become more accurate.

User Interaction and Incomplete Trimaps

The iterative minimization method 400 allows increased versatility of user interaction. In particular, incomplete labeling becomes feasible where, in place of the full trimap T, the user needs only specify, the background region $T_B$, leaving $T_F=0$, i.e. a bimap, (as discussed with reference to stage 202 of FIG. 2, for example). No hard foreground labeling is required.

In an implementation, iterative minimization (FIG. 4) deals with this incompleteness by allowing provisional labels on some pixels which can subsequently be retracted as discussed later.

Further User Editing

The initial, incomplete user-labeling is envisioned to be often sufficient to allow the entire segmentation to be completed automatically. Alternatively, further user editing may be performed, e.g., by brushing pixels, constraining them either to be firm foreground or firm background. After the brushing, the one-shot segmentation, as in FIG. 2. may be applied. In addition, an optional "refine" operation may be applied which also updates the color models, following user edits. This means that iterated graph cuts are applied as discussed in FIG. 3.This propagates the effect of edit operations in a way which may be beneficial in some implementations. Furthermore, it is envisioned that segmentation may be changed with existing tools such as intelligent scissors (a.k.a., live wire or magnetic lasso).

In some implementations, user editing may be applied to improve the object extraction. For example, user editing may be applied: (1) where regions of low contrast at the transition from foreground to background are present; (2) in camouflage situations in which the true foreground and background distributions overlap partially in color space; or (3) background material inside the selected user rectangle happens not to be adequately represented in the background region.

Figure 6:
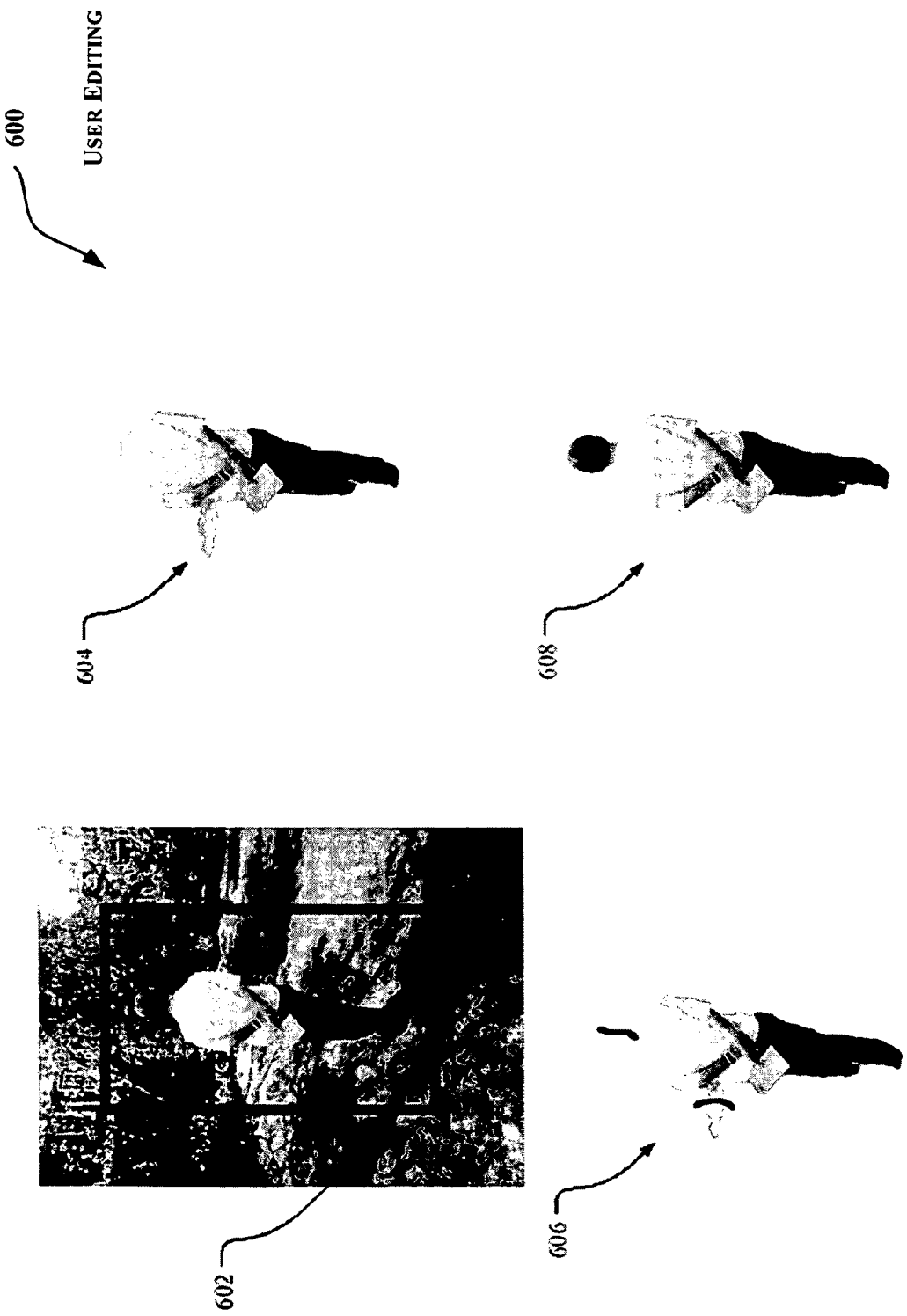
FIG. 6 illustrates an exemplary result of user editing.

An exemplary case is represented in FIG. 6. After the initial user interaction and segmentation (602 and 604, respectively), further user edits (606) provide a desired result (608). In one implementation, it is sufficient to brush, roughly, just part of a wrongly labeled area (606). After brushing, the estimation stage 406 may be applied to achieve the desired result, i.e., propagating the brushed labels (from 606) appropriately across the incorrectly labeled areas.

Hardware Implementation

Figure 7:
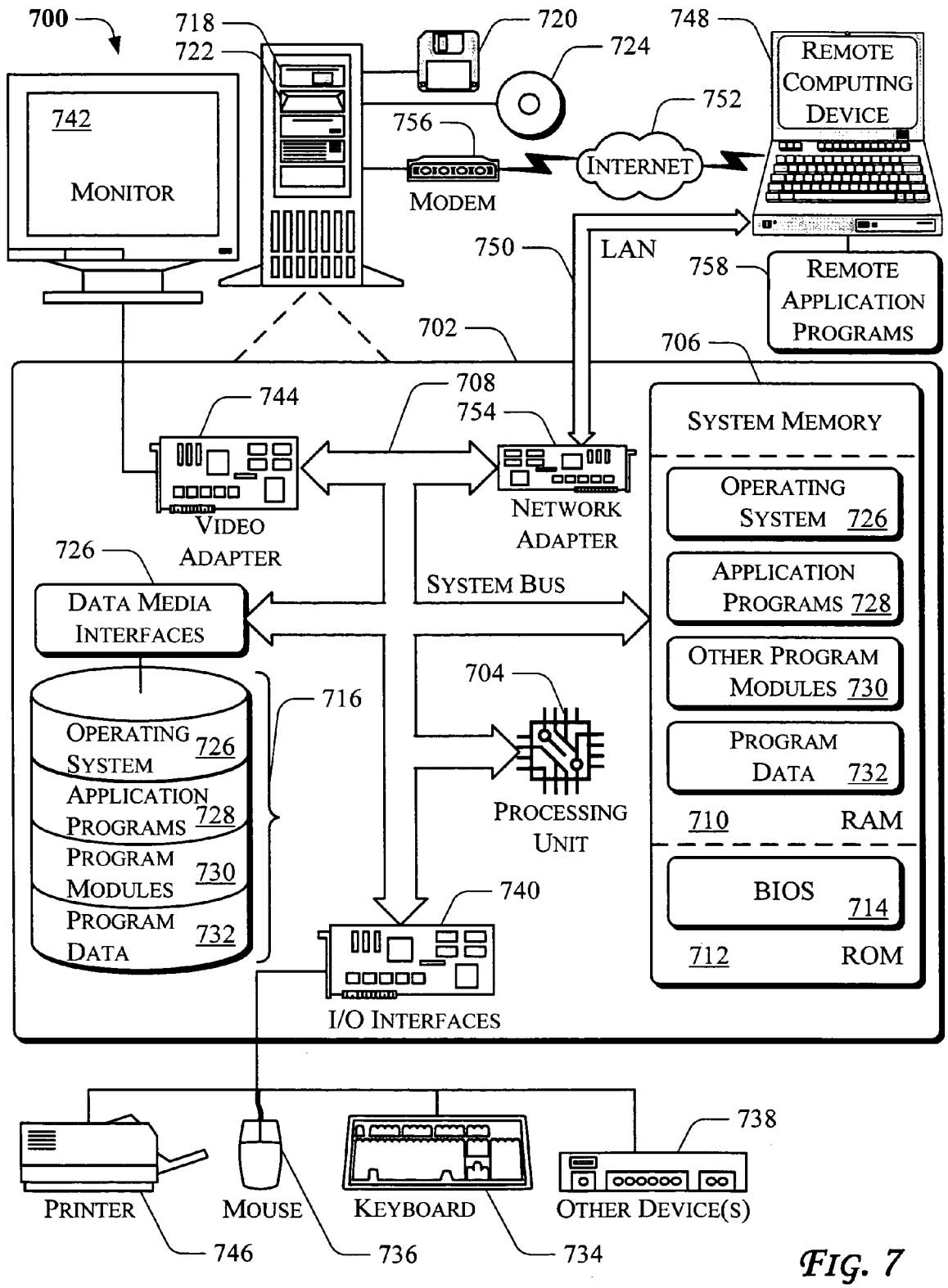
FIG. 7 illustrates a general computer environment, which can be used to implement the techniques described herein.

FIG. 7 illustrates a general computer environment 700, which can be used to implement the techniques described herein. For example, the computer environment 700 may be utilized to execute instructions associated with performing the tasks discussed with reference to the previous figures. The computer environment 700 is only one example of a computing environment and is not intended to suggest any limitation as to the scope of use or functionality of the computer and network architectures. Neither should the computer environment 700 be interpreted as having any dependency or requirement relating to any one or combination of components illustrated in the exemplary computer environment 700.

Computer environment 700 includes a general-purpose computing device in the form of a computer 702. The components of computer 702 can include, but are not limited to, one or more processors or processing units 704 (optionally including a cryptographic processor or co-processor), a system memory 706, and a system bus 708 that couples various system components including the processor 704 to the system memory 706.

The system bus 708 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 702 typically includes a variety of computer-readable media. Such media can be any available media that is accessible by computer 702 and includes both volatile and non-volatile media, removable and non-removable media.

The system memory 706 includes computer-readable media in the form of volatile memory, such as random access memory (RAM) 710, and/or non-volatile memory, such as read only memory (ROM) 712. A basic input/output system (BIOS) 714, containing the basic routines that help to transfer information between elements within computer 702, such as during start-up, is stored in ROM 712. RAM 710 typically contains data and/or program modules that are immediately accessible to and/or presently operated on by the processing unit 704.

Computer 702 may also include other removable/non-removable, volatile/non-volatile computer storage media. By way of example, FIG. 7 illustrates a hard disk drive 716 for reading from and writing to a non-removable, non-volatile magnetic media (not shown), a magnetic disk drive 718 for reading from and writing to a removable, non-volatile magnetic disk 720 (e.g., a "floppy disk"), and an optical disk drive 722 for reading from and/or writing to a removable, non-volatile optical disk 724 such as a CD-ROM, DVD-ROM, or other optical media. The hard disk drive 716, magnetic disk drive 718, and optical disk drive 722 are each connected to the system bus 708 by one or more data media interfaces 726. Alternatively, the hard disk drive 716, magnetic disk drive 718, and optical disk drive 722 can be connected to the system bus 708 by one or more interfaces (not shown).

The disk drives and their associated computer-readable media provide non-volatile storage of computer-readable instructions, data structures, program modules, and other data for computer 702. Although the example illustrates a hard disk 716, a removable magnetic disk 720, and a removable optical disk 724, it is to be appreciated that other types of computer-readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EE- PROM), and the like, can also be utilized to implement the exemplary computing system and environment.

Any number of program modules can be stored on the hard disk 716, magnetic disk 720, optical disk 724, ROM 712, and/or RAM 710, including by way of example, an operating system 726, one or more application programs 728, other program modules 730, and program data 732. Each of such operating system 726, one or more application programs 728, other program modules 730, and program data 732 (or some combination thereof) may implement all or part of the resident components that support the distributed file system.

A user can enter commands and information into computer 702 via input devices such as a keyboard 734 and a pointing device 736 (e.g., a "mouse"). Other input devices 738 (not shown specifically) may include a microphone, joystick, game pad, satellite dish, serial port, scanner, and/or the like. These and other input devices are connected to the processing unit 704 via input/output interfaces 740 that are coupled to the system bus 708, but may be connected by other interface and bus structures, such as a parallel port, game port, or a universal serial bus (USB).

A monitor 742 or other type of display device can also be connected to the system bus 708 via an interface, such as a video adapter 744. In addition to the monitor 742, other output peripheral devices can include components such as speakers (not shown) and a printer 746 which can be connected to computer 702 via the input/output interfaces 740.

Computer 702 can operate in a networked environment using logical connections to one or more remote computers, such as a remote computing device 748. By way of example, the remote computing device 748 can be a personal computer, portable computer, a server, a router, a network computer, a peer device or other common network node, game console, and the like. The remote computing device 748 is illustrated as a portable computer that can include many or all of the elements and features described herein relative to computer 702.

Logical connections between computer 702 and the remote computer 748 are depicted as a local area network (LAN) 750 and a general wide area network (WAN) 752. Such networking environments are commonplace in offices, enterprise-wide computer networks, intranets, and the Internet.

When implemented in a LAN networking environment, the computer 702 is connected to a local network 750 via a network interface or adapter 754. When implemented in a WAN networking environment, the computer 702 typically includes a modem 756 or other means for establishing communications over the wide network 752. The modem 756, which can be internal or external to computer 702, can be connected to the system bus 708 via the input/output interfaces 740 or other appropriate mechanisms. It is to be appreciated that the illustrated network connections are exemplary and that other means of establishing communication link(s) between the computers 702 and 748 can be employed.

In a networked environment, such as that illustrated with computing environment 700, program modules depicted relative to the computer 702, or portions thereof, may be stored in a remote memory storage device. By way of example, remote application programs 758 reside on a memory device of remote computer 748. For purposes of illustration, application programs and other executable program components such as the operating system are illustrated herein as discrete blocks, although it is recognized that such programs and components reside at various times in different storage components of the computing device 702, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various implementations.

An implementation of these modules and techniques may be stored on or transmitted across some form of computer-readable media. Computer-readable media can be any available media that can be accessed by a computer. By way of example, and not limitation, computer-readable media may comprise "computer storage media" and "communications media."

"Computer storage media" includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically includes computer-readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared (IR), wireless fidelity (e.g., IEEE 802.11b wireless networking) (Wi-Fi), cellular, Bluetooth enabled, and other wireless media. Combinations of any of the above are also included within the scope of computer-readable media.

CONCLUSION

Although the invention has been described in language specific to structural features and/or methodological acts, it is to be understood that the invention defined in the appended claims is not necessarily limited to the specific features or acts described. Hence, the specific features and acts are disclosed as exemplary forms of implementing the claimed invention.

What is claimed is:

1. A method comprising:

presenting an image including an object on a display of a computer;

receiving user input for defining a selected region of the image enclosing pixels of the image corresponding to the object and one or more other pixels of the image;

segmenting the image into an initial foreground portion and an initial background portion based on the selected region, the initial foreground portion defined by pixels of the image interior to the selected region, the initial background portion defined by pixels of the image exterior to the selected region;

determining foreground and background properties corresponding to the initial foreground and background portions, wherein the foreground and background properties are modeled using image features learned from the pixels of the image;

updating the foreground and background properties based on the initial foreground and background portions;

updating the initial foreground and background portions based on the updated foreground and background properties to estimate segmentation as a minimum of a segmentation function;

automatically determining whether convergence to the minimum of the segmentation function has been achieved;

when it is determined that convergence has not been achieved, automatically alternating between performing additional updating of the foreground and background properties and additional updating of the foreground and background portions until convergence to the minimum of the segmentation function has been achieved; and outputting at least one of the foreground and background portions to the display of the computer after convergence has been achieved.

2. A method as recited by claim 1, wherein the updating of the foreground and background properties is based on all pixels of the foreground and background portions.

3. A method as recited by claim 1, wherein the updating of the foreground and background portions is performed by optimization.

4. A method as recited by claim 1, wherein segmenting the image comprises defining the initial background portion and defining the initial foreground portion as all remaining pixels of the image not included in the initial background portion.

5. A method as recited by claim 1, wherein the segmenting is performed by a user through defining a trimap or a bimap.

6. A method as recited by claim 1, further comprising learning a plurality of parameters corresponding to distributions, wherein the distributions are utilized to model the properties of the foreground and background portions of the image.

7. A method as recited by claim 1, wherein the foreground and background portions of the image are mutually exclusive.

8. A method as recited by claim 1, wherein the properties are selected from a group comprising color and blur properties.

9. A method as recited by claim 1, further comprising digitally processing the foreground portion.

10. A method as recited by claim 1, further comprising assigning a model component to each pixel of an image, wherein the properties corresponding to the foreground and background portions comprise a plurality of modeling parameters corresponding to a foreground portion and a background portion of the image.

11. A method as recited by claim 10, wherein the modeling parameters are determined from pixel values of the image.

12. A method as recited by claim 10, wherein the modeling parameters correspond to Gaussian mixture models.

13. A method as recited by claim 1, further comprising extracting an object contained within the foreground portion.

14. One or more computer storage media having instructions stored thereon that, when executed, direct a machine to perform acts comprising:

presenting an image including an object on a display of a computer;

receiving user input for defining a selected region of the image enclosing pixels of the image corresponding to the object and one or more other pixels of the image;

segmenting the image into an initial foreground portion and an initial background portion based on the selected region, the initial foreground portion defined by pixels of the image interior to the selected region, the initial background portion defined by pixels of the image exterior to the selected region;

determining foreground and background properties corresponding to the initial foreground and background portions, wherein the foreground and background properties are modeled using image features learned from the pixels of the image;

updating the foreground and background properties based on the initial foreground and background portions;

updating the initial foreground and background portions based on the updated foreground and background properties to estimate segmentation as a minimum of a segmentation function;

automatically determining whether convergence to the minimum of the segmentation function has been achieved; and when it is determined that convergence has not been achieved, automatically alternating between performing additional updating of the foreground and background properties and additional updating of the foreground and background portions until convergence to the minimum of the segmentation function has been achieved.

15. One or more computer storage media as recited by claim 14, wherein the updating of the foreground and background properties is based on all pixels of the foreground and background portions.

16. One or more computer storage media as recited by claim 14, wherein the updating of the foreground and background portions is performed by optimization.

17. One or more computer storage media as recited by claim 14, wherein segmenting the image comprises defining the initial background portion and defining the initial foreground portion as all remaining pixels of the image not included in the initial background portion.

18. One or more computer storage media as recited by claim 14, wherein the segmenting is performed by a user through defining a trimap or a bimap.

19. One or more computer storage media as recited by claim 14, wherein the acts further comprise learning a plurality of parameters corresponding to Gaussian mixture models, wherein the Gaussian mixture models are utilized to model the properties of the foreground and background portions of the image.

20. One or more computer storage media as recited by claim 14, wherein the foreground and background portions of the image are mutually exclusive.

21. One or more computer storage media as recited by claim 14, wherein the properties are selected from a group comprising color and blur properties.

22. One or more computer storage media as recited by claim 14, wherein the acts further comprise digitally processing the foreground portion.

23. One or more computer storage media as recited by claim 14, wherein the acts further comprise assigning a model component to each pixel of an image, and the properties corresponding to the foreground and background portions comprise a plurality of modeling parameters corresponding to a foreground portion and a background portion of the image.

24. One or more computer storage media as recited by claim 23, wherein the modeling parameters are determined from pixel values of the image.

25. One or more computer storage media as recited by claim 23, wherein the modeling parameters correspond to Gaussian mixture models.

26. One or more computer storage media as recited by claim 14, wherein the acts further comprise extracting an object contained within the foreground portion.

* * * * *